United States Patent
Chen et al.

(10) Patent No.: US 10,285,238 B2
(45) Date of Patent: May 7, 2019

(54) METHOD AND APPARATUS FOR SYNCHRONOUS LIGHTING CONTROL BY MOBILE TERMINAL

(71) Applicant: SHENZHEN JBT SMART LIGHTING CO., LTD., Shenzhen, Guangdong (CN)

(72) Inventors: Huiping Chen, Guangdong (CN); Wenbin Zhang, Guangdong (CN); Xukai Wang, Guangdong (CN); Chengguang Zhong, Guangdong (CN); Shengnan Xiao, Guangdong (CN); Jinglian Zhu, Guangdong (CN); Ling Peng, Guangdong (CN); Weiliang Yu, Guangdong (CN); Bingfeng Wang, Guangdong (CN); Anning Huang, Guangdong (CN)

(73) Assignee: SHENZHEN JBT SMART LIGHTING CO., LTD., Guangdong (CN)

( * ) Notice: Subject to any disclaimer, the term of this patent is extended or adjusted under 35 U.S.C. 154(b) by 0 days.

(21) Appl. No.: 15/767,642

(22) PCT Filed: Apr. 28, 2017

(86) PCT No.: PCT/CN2017/082322
§ 371 (c)(1),
(2) Date: Apr. 11, 2018

(87) PCT Pub. No.: WO2017/186153
PCT Pub. Date: Nov. 2, 2017

(65) Prior Publication Data
US 2018/0302970 A1   Oct. 18, 2018

(30) Foreign Application Priority Data
Apr. 29, 2016   (CN) .......................... 2016 1 0284126

(51) Int. Cl.
*H05B 33/08*       (2006.01)
*H05B 37/02*       (2006.01)
*G06F 3/0484*      (2013.01)

(52) U.S. Cl.
CPC ....... *H05B 33/0863* (2013.01); *G06F 3/0484* (2013.01); *H05B 33/0845* (2013.01);
(Continued)

(58) Field of Classification Search
CPC ............ H05B 37/0272; H05B 33/0845; H05B 33/0872; H05B 33/0812; H05B 33/0857;
(Continued)

(56) References Cited

U.S. PATENT DOCUMENTS 8,674,625 B2 * 3/2014 So ..................... H05B 33/0863
                                                          315/152
9,600,983 B1 * 3/2017 Lydecker ................. G08B 5/36
(Continued)

FOREIGN PATENT DOCUMENTS

| CN | 103068112 A | 4/2013 |
| CN | 104977910 A | 10/2015 |
| CN | 204707306 U | 10/2015 |

OTHER PUBLICATIONS

International Search Report, dated Jul. 13, 2017 for corresponding International Application No. PCT/CN2017/082322 with English translation.
(Continued)

*Primary Examiner* — Vibol Tan
(74) *Attorney, Agent, or Firm* — Intellectual Property Law Group LLP

(57) ABSTRACT

The present disclosure provides a method and an apparatus for synchronous lighting control by a mobile terminal. The method comprises acquiring a loading program of each of a plurality of lamps required to be synchronously controlled;
(Continued)

acquiring a state of each of the plurality of lamps according to the loading program; grouping the plurality of lamps according to the state of each of the plurality of lamps; and controlling a switching and a color of each of the plurality of lamps synchronously according to the grouping. A beneficial effect of the present disclosure is that by grouping the smart lamps, the smart lamps are managed in batch, and by using a colorful scene and a changing music to control a switching and a color of the smart lamps, the intelligence level of the system is improved, the control style is enriched, and the user experience is better.

9 Claims, 1 Drawing Sheet

(52) U.S. Cl.
CPC ......... *H05B 33/0872* (2013.01); *H05B 37/02* (2013.01); *H05B 37/0209* (2013.01); *H05B 37/0272* (2013.01); *Y02B 20/40* (2013.01); *Y02B 20/48* (2013.01)

(58) Field of Classification Search
CPC ............ H05B 37/0245; H05B 33/0824; H05B 33/0884; H05B 37/02; H05B 37/0218; H05B 37/0263; H04W 4/08; H04W 4/14; H04W 4/80; H04W 76/15; H04W 84/12; H04W 88/08; H04W 8/186; G05B 19/0426; G05B 2219/23153; H04L 12/2803; H04L 67/10; H04L 12/2814; H04L 41/082; H04L 12/282; H04L 2012/285; H04L 29/08; H04L 41/0806; H04L 51/32; H04L 63/083; H04L 63/0884; H04L 63/10; Y02B 20/48; Y02B 20/345; Y02B 20/347; G08C 2201/42; G08C 2201/93; G08C 17/02; G08C 2201/40; F21K 9/275; F21K 9/278; H04M 1/7253; H04Q 2209/40
See application file for complete search history.

(56) References Cited

U.S. PATENT DOCUMENTS

| | | | |
|---|---|---|---|
| 2014/0239816 A1 | 8/2014 | Lee et al. | |
| 2014/0369258 A1* | 12/2014 | Lin | H04W 4/14 370/328 |
| 2015/0035437 A1* | 2/2015 | Panopoulos | F21V 14/02 315/112 |
| 2016/0081166 A1* | 3/2016 | Eddins | H05B 37/0254 315/294 |
| 2016/0092198 A1* | 3/2016 | Vangeel | G06F 8/654 717/173 |
| 2016/0205362 A1* | 7/2016 | Tang | H05B 33/0845 348/744 |
| 2016/0338170 A1* | 11/2016 | Lebel | H05B 33/0863 |
| 2018/0177031 A1* | 6/2018 | Yoo | H04M 1/72533 |

OTHER PUBLICATIONS

Written Opinion, dated Jul. 3, 2017 for corresponding International Application No. PCT/CN2017/082322.

* cited by examiner

METHOD AND APPARATUS FOR SYNCHRONOUS LIGHTING CONTROL BY MOBILE TERMINAL

TECHNICAL FIELD

The present disclosure relates to the field of intelligent lighting control technology, especially to a method and an apparatus for synchronous lighting control by a mobile terminal.

BACKGROUND

A smart lamp not only can provide an illumination function, but can implement a simple sensing function and an automatic control, thereby saving the energy and facilitating people's life. The smart lamp currently on the market primarily refers to an infrared lamp comprising a light sensor, an infrared detector for human body, and a lighting source. The function of the infrared lamp are realized by using the light sensor to sense the light intensity to automatically open the infrared detector first, and then using the infrared detector to detect heat radiation of the human body to sense if someone is coming, by which an effect on intelligent control of an opening and closing of the lamp is achieved.

However, in the above-mentioned smart lamp, a power switch of the infrared lamp can only be manually controlled in the field, and an authentic intellectualization cannot be realized. In addition, the conventional smart lamp has little control style and poor user experience.

SUMMARY

An object of the present disclosure is to provide a method and an apparatus for synchronous lighting control by a mobile terminal to solve the problem that the conventional smart lamp has low intellectualization, little control style, and poor user experience.

The technical scheme of the present disclosure is implemented as follows.

An object of the present disclosure is to provide the method for synchronous lighting control by the mobile terminal comprising:

acquiring a loading program of each of a plurality of lamps required to be synchronously controlled;

acquiring a state of each of the plurality of lamps according to the loading program;

grouping the plurality of lamps according to the state of each of the plurality of lamps; and controlling a switching and a color of each of the plurality of lamps synchronously according to the grouping.

In the method according to one embodiment of the present disclosure, the step of acquiring a loading program of each of a plurality of lamps required to be synchronously controlled comprises:

inputting an user account and a password;

scanning the plurality of lamps required to be synchronously controlled in a preset range; and loading the loading program of each of the plurality of lamps.

In the method according to one embodiment of the present disclosure, the step of acquiring a state of each of the plurality of lamps according to the loading program comprises:

acquiring the state of each of the plurality of lamps, wherein the state comprises a location, a type, and an encryption attribute; and determining a control permission of each of the plurality of lamps according to the user account and the encryption attribute.

In the method according to one embodiment of the present disclosure, the step of grouping the plurality of lamps according to the state of each of the plurality of lamps comprises:

grouping the plurality of lamps according to the location of each of the plurality of lamps, and/or grouping the plurality of lamps according to the type of each of the plurality of lamps.

In the method according to one embodiment of the present disclosure, the step of controlling a switching and a color of each of the plurality of lamps synchronously according to the grouping comprises:

selecting at least one group of lamps;

controlling a switching time of the selected at least one group of lamps periodically; and/or controlling a color of the selected at least one group of lamps.

In the method according to one embodiment of the present disclosure, the step of controlling a color of the selected at least one group of lamps comprises:

controlling the color of the selected at least one group of lamps by clicking a picture; or controlling the color of the selected at least one group of lamps by playing a music.

In the method according to one embodiment of the present disclosure, the step of controlling the color of the selected at least one group of lamps by clicking a picture comprises:

selecting the picture as a control background;

clicking the picture in the control background, and obtaining a color of a current click coordinate; and controlling the selected at least one group of lamps to emit a corresponding color according to the color of the current click coordinate.

In the method according to one embodiment of the present disclosure, the step of controlling the color of the selected at least one group of lamps by playing a music comprises:

selecting the music as a background music;

playing the background music, and obtaining a current scale; and controlling the selected at least one group of lamps to emit a corresponding color according to the current scale.

In the method according to one embodiment of the present disclosure, the step of controlling a switching and a color of each of the plurality of lamps synchronously according to the grouping further comprises:

selecting one or more lamps from the plurality of lamps to simultaneously control a switching and a color of the selected one or more lamps.

In another aspect, the apparatus for synchronous lighting control by the mobile terminal is provided comprises:

a program loading module to acquire a loading program of each of a plurality of lamps required to be synchronously controlled;

a state acquiring module to acquire a state of each of the plurality of lamps according to the loading program;

a grouping module to group the plurality of lamps according to the state of each of the plurality of lamps; and a switch and color controlling module to control a switching and a color of each of the plurality of lamps according to the grouping.

Thus, the beneficial effect of the present disclosure is that by grouping the smart lamps, the smart lamps are managed in batch, and by using a colorful scene and a changing music to control a switching and a color of the smart lamps, the intelligence level of the system is improved, the control style is enriched, and the user experience is better.

BRIEF DESCRIPTION OF THE DRAWINGS

The present disclosure will now be further described with reference to the accompanying drawings and embodiments, in which.

DETAILED DESCRIPTION

For a clear understanding of the technical features, objects and effects of the present disclosure, specific embodiments of the present disclosure will now be described in detail with reference to the accompanying drawings. It is to be understood that the following description is merely exemplary embodiments of the present disclosure, and is not intended to limit the scope of the present disclosure.

The present disclosure provides a method and an apparatus for synchronous lighting control by a mobile terminal. An object of the present disclosure is to make the system smart by setting an APP for controlling lamps on the mobile terminal. By grouping the lamps based on states of the lamps, and managing the lamps having the same characteristics uniformly, the intelligence level of the system is improved. By using a colorful scene and a changing music to control a switching and a color of the smart lamps, the control style is enriched and the user experience is better.

Figure 1:
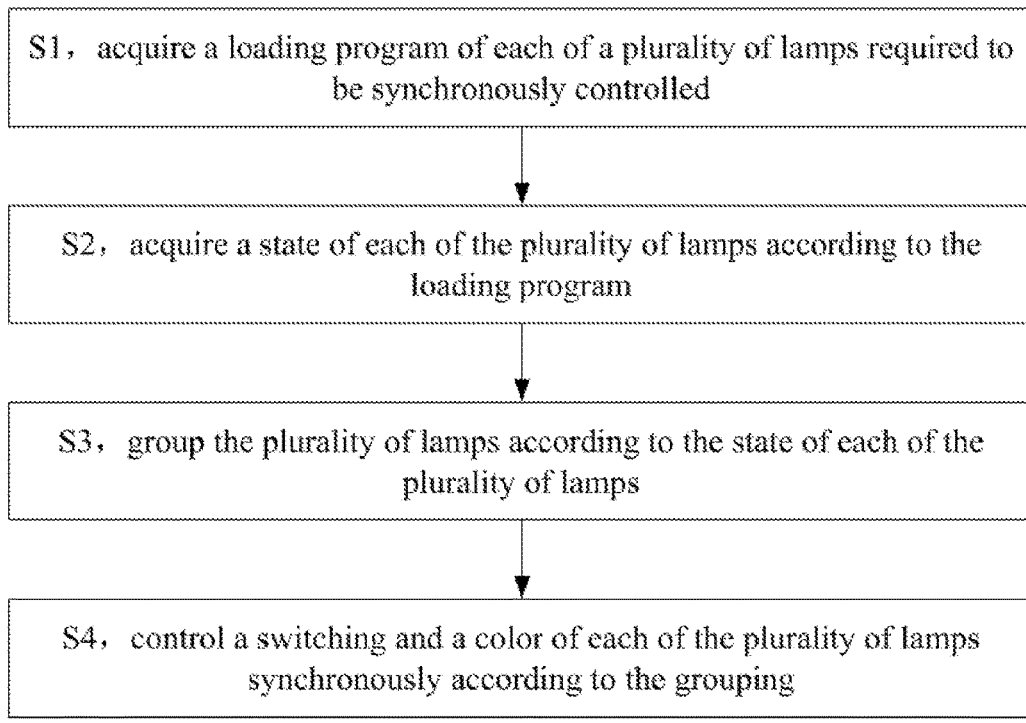
FIG. 1 is a flow chart of a method for synchronous lighting control by a mobile terminal according to one embodiment of the present disclosure.

Referring to FIG. 1, FIG. 1 is a flow chart of the method for synchronous lighting control by the mobile terminal according to one embodiment of the present disclosure. The method includes the following steps S1 to S4.

S1, acquire a loading program of each of a plurality of lamps required to be synchronously controlled. The step S1 includes the following substeps S11 to S13.

S11, input a user account and a password. In an APP on the mobile terminal, more control permissions can be obtained by logging into the user account. More specifically, the plurality of lamps required to be synchronously controlled can be added to a directory of the user account. One or more lamps added to the directory of the user account can also be deleted according to needs to reduce a number of the lamps controlled in the APP.

S12, scan the plurality of lamps required to be synchronously controlled in a preset range. For example, a signal strength can be characterized by Rssi (Received Signal Strength Indication). The closer the Rssi value is to 0, the better the signal is. In general, a device with better signal is selected to be connected, otherwise the connection may fail. A mobile phone (which is the mobile terminal) with the Rssi value less than −80 is usually far from the plurality of lamps, and is usually not used to control the plurality of lamps.

S13, loading the loading program of each of the plurality of lamps. In general, a scanned lamp is loaded with the corresponding loading program, by which the plurality of lamps can be controlled by the mobile terminal.

S2, acquire a state of each of the plurality of lamps according to the loading program. The step S2 includes the following substeps S21 to S22.

S21, acquire the state of each of the plurality of lamps. The state includes a location, a type, and an encryption attribute. For example, the location includes a bedroom, a study, a hall, etc. The type includes a down lamp, an ultrathin down lamp, a RGB lamp belt, a RGB+C+W lamp belt (which includes a RGB lamp belt, a warm color lamp belt, and a cold color lamp belt), a ceiling lamp, a small panel lamp, a long tube lamp, a long panel lamp, etc. The encryption attribute includes an encrypted lamp and an unencrypted lamp, that is, whether the lamp only can be controlled after logging the user account. Colors emitted by the plurality of lamps include at least RGB three colors.

S22, determining a control permission of each of the plurality of lamps according to the user account and the encryption attribute. For example, the encrypted lamp can only be controlled after logging to the user account, and the unencrypted lamp can be controlled without logging to the user account.

S3, group the plurality of lamps according to the state of each of the plurality of lamps. The step S3 includes the following substeps S31 to S32.

S31, group the plurality of lamps according to the location of each of the plurality of lamps. For example, the lamps located in the bedroom are put into one group, the lamps located in the study are put into one group, and the lamps located in the hall are put into one group.

S32, group the plurality of lamps according to the type of each of the plurality of lamps. There is no specific order between the step S31 and the step S32, which can be set according to the requirement of users, or can be default setting of the system. For example, down lamps are put into one group, ultrathin down lamps are put into one group, ceiling lamps are put into one group, etc.

S4, control a switching and a color of each of the plurality of lamps synchronously according to the grouping. The step S4 includes the following substeps S41 to S 43.

S41, select at least one group of lamps. For example, a group of lamps located in the bedroom is selected as a controlled object, and the following operations are applied to the selected group of lamps.

S42, control a switching time of the selected at least one group of lamps periodically, for example, by setting a periodic time, a switch, a repetition time, etc.

S43, control a color of the selected at least one group of lamps. There is no specific order between the step S42 and the step S43, which can be set according to the requirement of users, or can be default setting of the system. The step S43 includes the following substeps S431 to S432.

S431, control the color of the selected at least one group of lamps by clicking a picture, that is, control the color of the selected at least one group of lamps by a colorful scene. The S431 includes the following substeps S4311 to S4313.

S4311, select the picture as a control background. For example, select a seven color disk as the control background.

S4312, click the picture in the control background and obtain a color of a current click coordinate. For example, click a red color in the seven color disk.

S4313, control the selected at least one group of lamps to emit a corresponding color according to the color of the current click coordinate. For example, the light emitted by the selected at least one group of lamps is red correspondingly. In addition, the picture can be a figure painting, a landscape painting, a building painting, etc.

S432, control the color of the selected at least one group of lamps by playing a music. Similarly, there is no specific order between the step S431 and the step S432, meanwhile, only one step of the step S431 and the step S432 can be performed. That is, when the step S431 is performing, the step S432 is not performing, and when the step S432 is performing, the step S431 is not performing. The step S431 includes the following substeps S4321 to S4323.

S4321, select the music as a background music. For example, select "For Elise" as the background music.

S4322, play the background music and obtain a current scale. Pick up the current scale. In general, each scale corresponds to one color. For example, seven scales respectively corresponds to seven colors: red, orange, yellow, green, cyan, blue, and purple.

S4323, control the selected at least one group of lamps to emit a corresponding color according to the current scale. If the current scale corresponds to yellow, the selected at least one group of lamps is controlled to emit yellow.

The above is only one embodiment of the present disclosure. In other embodiments, a rhythm of the music, a tone of the music, etc can be combined with the color to control a color effect of the lamps by the changing music. In addition, the music can be played in a random mode, in a list cycle mode, etc.

Preferably, the step S4 further includes a step S44.

S44, select one or more lamps from the plurality of lamps to simultaneously control a switch and a color of the selected one or more lamps, that is, a number of the lamps to be controlled can be selected. In addition, a RGB control can also be selected. The RGB control includes a color control, a luminance control, and a color temperature control. A RGB controller mainly includes a color picker, a luminance box, and a color temperature box to respectively select the color, the luminance, and the color temperature.

Preferably, the APP also has a rename function and a physical address modification function.

Figure 2:
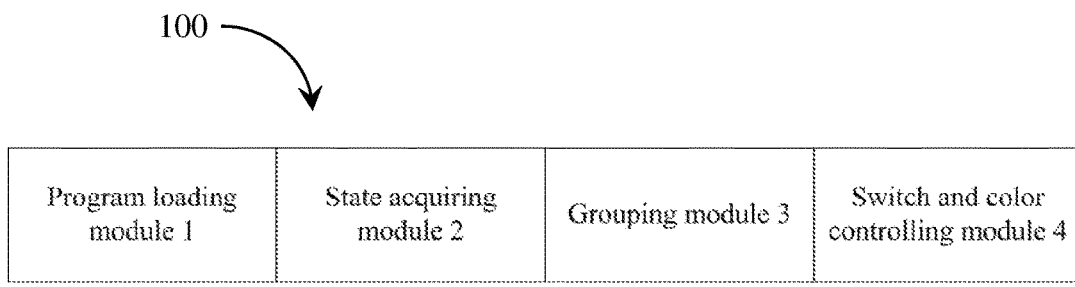
FIG. 2 is a block diagram of an apparatus for synchronous lighting control by a mobile terminal according to one embodiment of the present disclosure.

Referring to FIG. 2, FIG. 2 is a block diagram of an apparatus 100 for synchronous lighting control by the mobile terminal according to one embodiment of the present disclosure. The apparatus 100 for synchronous lighting control by the mobile terminal can be realized by the APP set on the mobile terminal. The apparatus 100 includes a program loading module 1, a state acquiring module 2, a grouping module 3, and a switch and color controlling module 4.

The program loading module 1 is configured to acquire the loading program of each of the plurality of lamps required to be synchronously controlled, more specially, to input the user account and the password, scan the plurality of lamps required to be synchronously controlled in the preset range, and load the loading program of each of the plurality of lamps.

The state acquiring module 2 is configured to acquire the state of each of the plurality of lamps according to the loading program, more specially, to acquire the state of each of the plurality of lamps in which the state includes the location, the type, and the encryption attribute, and determine the control permissions of the plurality of lamps according to the user account and the encryption attribute.

The grouping module 3 is configured to group the plurality of lamps according to the state of each of the plurality of lamps, more specially, to group the plurality of lamps according to the location of each of the plurality of lamps, and/or group the plurality of lamps according to the type of each of the plurality of lamps.

The switch and color controlling module 4 is configured to control the switching and color of each of the plurality of lamps according to the grouping, more specially, to select at least one group of lamps, control a switching time of the selected at least one group of lamps periodically, and/or control a color of the selected at least one group of lamps.

A control manner of the switch and color controlling module 4 includes a colorful scene control and a changing music control.

The colorful scene control includes selecting a picture as a control background, clicking the picture in the background and obtain a color of a current click coordinate, and controlling the selected at least one group of lamps to emit a corresponding color according to the color of the current click coordinate.

The changing music control includes selecting a music as a background music, playing the background music and obtaining a current scale, and control the selected at least one group of lamps to emit a corresponding color according to the current scale.

The present disclosure provides various operations for the embodiments. In one embodiment, one or more operations may constitute one or more computer-readable instructions stored in the computer-readable storage medium, which cause the computing device to perform the operations when be executed on the communication device. Some or all of the described sequence of operations should not be construed to imply that these operations are necessary to be dependent on the order. A person skilled in the art will appreciate that alternative orders may also have the advantages described in this specification. Moreover, it should be understood that not all of the operations must be presented in each of the embodiments provided herein.

Moreover, the word "preferred" used herein means serving as an embodiment, an illustration, or an example. As described herein, the term "preferred" is not necessary to be construed as any aspect or design superior to the other aspects or designs. Instead, the word exemplary manner is designed to specific concepts. In this application, the term "or" refers to an inclusive "or" rather than an exclusive "or." That is, unless specified otherwise, or clear from the context, "X using A or B" means any natural aimed inclusive replacement. That is, if X employs A; X employs B; or X employs both A and B, then "X using A or B" is satisfied by any of the aforementioned circumstances.

Furthermore, despite relative to one or more implementations shown and described in the present disclosure, the equivalent variations and modifications based on the present specification and drawings will occur to those skilled in the art upon reading and understanding. The present disclosure includes all such modifications and variations, and is only limited by the scope of the appending claims. Especially with regard to various functions performed by the above-described components (e.g., elements, resources, etc.), the terms used to describe such components are intended to indicate any component (unless otherwise indicated) corresponding to a specified function (for example, that is functionally equivalent) performed by the described components, even though not structurally equivalent to the disclosed structure carrying out the functions in the exemplary implementations of the present disclosure described in the content text. In addition, although a particular feature of the present disclosure may have been disclosed with respect to one of several embodiments, this feature can be combined with one or more other features in the other embodiments which are expected or advantageous to any given or particular application. Moreover, the terms "including", "having", "with", or variants thereof used in the detailed description or the claims are intended to be used in a manner similar to the term "comprising".

Various functional units according to the embodiments of the present disclosure may be integrated in one processing module or may exist as various separate physical units, or two or more units may be integrated in one module. The integrated module may be implemented through hardware, or may also be implemented in a form of a software functional module. When the integrated module is implemented in the form of the software functional module and sold or used as a separate product, the integrated module may also be stored in a computer readable storage medium. The storage medium may be a read only memory, a magnetic disk, an optical disk, or the like. The devices or systems may execute the method in the corresponding method embodiment.

Finally, the above descriptions are merely exemplary embodiments of the present disclosure, but not intended to limit the present disclosure. Any modification, equivalent replacement, or improvement made without departing from the spirit and principle of the present disclosure should fall within the protection scope of the present disclosure.

What is claimed is:

1. A method for synchronous lighting control by a mobile terminal comprising:
    acquiring a loading program of each of a plurality of lamps required to be synchronously controlled;
    acquiring a state of each of the plurality of lamps according to the loading program;
    grouping the plurality of lamps according to the state of each of the plurality of lamps; and
    controlling a switching and a color of each of the plurality of lamps synchronously according to the grouping, including selecting one or more lamps from the plurality of lamps to simultaneously control a switching and a color of the selected one or more lamps.

2. The method of claim 1, wherein the step of acquiring a loading program of each of a plurality of lamps required to be synchronously controlled comprises:
    inputting an user account and a password;
    scanning the plurality of lamps required to be synchronously controlled in a preset range; and
    loading the loading program of each of the plurality of lamps.

3. The method of claim 2, wherein the step of acquiring a state of each of the plurality of lamps according to the loading program comprises:
    acquiring the state of each of the plurality of lamps, wherein the state comprises a location, a type, and an encryption attribute; and
    determining a control permission of each of the plurality of lamps according to the user account and the encryption attribute.

4. The method of claim 3, wherein the step of grouping the plurality of lamps according to the state of each of the plurality of lamps comprises:
    grouping the plurality of lamps according to the location of each of the plurality of lamps, and/or
    grouping the plurality of lamps according to the type of each of the plurality of lamps.

5. The method of claim 1, wherein the step of controlling a switching and a color of each of the plurality of lamps synchronously according to the grouping comprises:
    selecting at least one group of lamps;
    controlling a switching time of the selected at least one group of lamps periodically; and/or
    controlling a color of the selected at least one group of lamps.

6. The method of claim 5, wherein the step of controlling a color of the selected at least one group of lamps comprises:
    controlling the color of the selected at least one group of lamps by clicking a picture; or
    controlling the color of the selected at least one group of lamps by playing a music.

7. The method of claim 6, wherein the step of controlling the color of the selected at least one group of lamps by clicking a picture comprises:
    selecting the picture as a control background;
    clicking the picture in the control background, and obtaining a color of a current click coordinate; and
    controlling the selected at least one group of lamps to emit a corresponding color according to the color of the current click coordinate.

8. The method of claim 6, wherein the step of controlling the color of the selected at least one group of lamps by playing a music comprises:
    selecting the music as a background music;
    playing the background music, and obtaining a current scale; and
    controlling the selected at least one group of lamps to emit a corresponding color according to the current scale.

9. An apparatus for synchronous lighting control by a mobile terminal comprising:
    a program loading module to acquire a loading program of each of a plurality of lamps required to be synchronously controlled;
    a state acquiring module to acquire a state of each of the plurality of lamps according to the loading program;
    a grouping module to group the plurality of lamps according to the state of each of the plurality of lamps; and
    a switch and color controlling module to control a switching and a color of each of the plurality of lamps synchronously according to the grouping, including selecting one or more lamps from the plurality of lamps to simultaneously control a switching and a color of the selected one or more lamps.

* * * * *